Sept. 8, 1931. C. W. WEISS 1,822,555
TRANSMISSION
Filed April 13, 1928   2 Sheets-Sheet 1
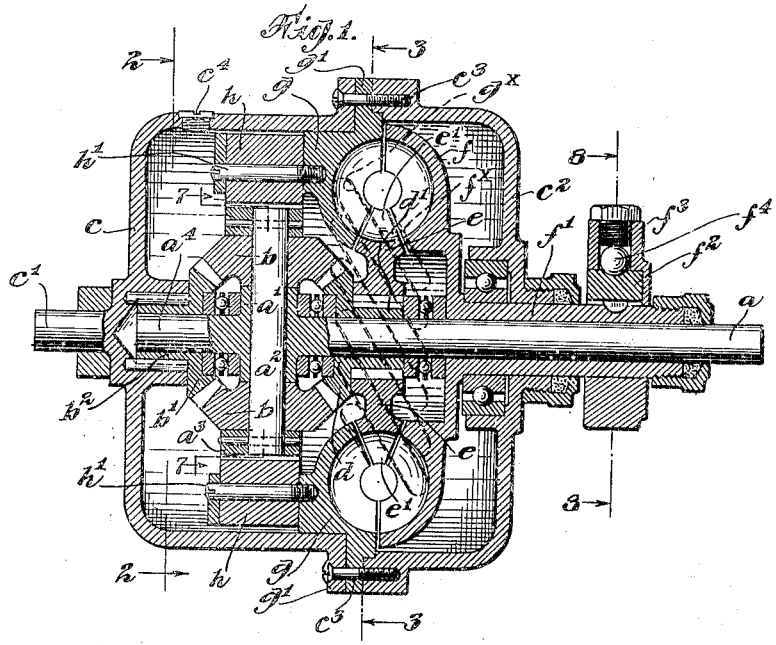
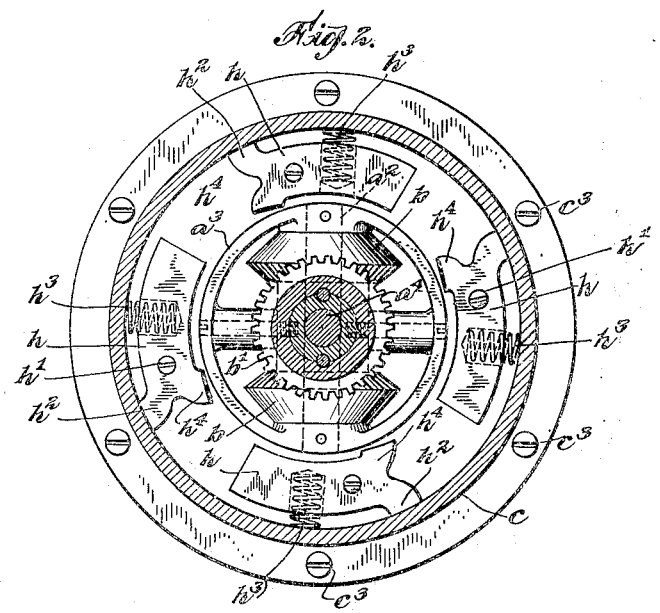

Sept. 8, 1931.          C. W. WEISS              1,822,555
                        TRANSMISSION
                    Filed April 13, 1928      2 Sheets-Sheet 2
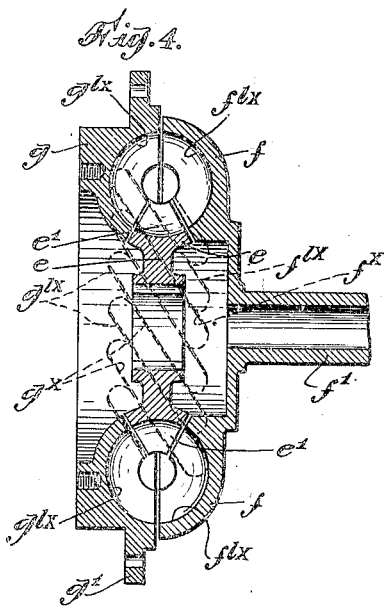
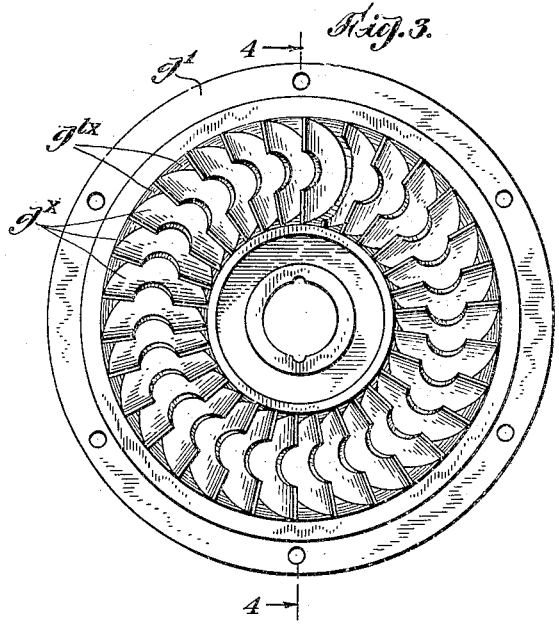
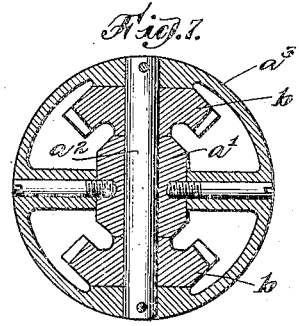
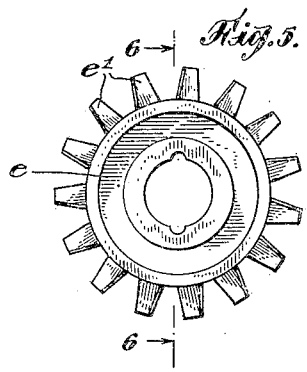
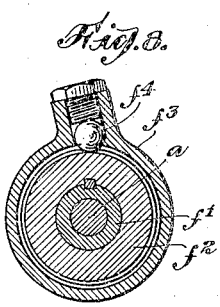

Patented Sept. 8, 1931

1,822,555

UNITED STATES PATENT OFFICE

CARL W. WEISS, OF NEW YORK, N. Y.

TRANSMISSION

Application filed April 13, 1928. Serial No. 269,620.

This invention relates to hydraulic power transmitting devices in which power is transmitted through the medium of a liquid caused to acquire a vortical movement. The object of the invention is generally to simplify and improve the construction of transmissions of this character and particularly to make it possible to multiply the torque transmitted from the prime mover and to provide automatically for the transmission of power at a 1:1 ratio when the predetermined speed has been attained. These and other features of the invention will be referred to in the following description of the embodiments of the invention which have been chosen for illustration and are shown in the accompanying drawings in which:

Figure 1 is a view in longitudinal section of one form of apparatus in which the invention may be embodied.

Figure 2 is a view in transverse section on the plane indicated by the broken line 2—2 of Figure 1.

Figure 3 is a face view of the driven member partly in section on the plane indicated by the broken line 3—3 of Figure 1.

Figure 4 is a view in section on the plane indicated by the broken line 4—4 of Figure 3.

Figure 5 is a detail view in side elevation of the impeller shown in Figure 1.

Figure 6 is a view in section on the plane indicated by the broken line 6—6 of Figure 5.

Figure 7 is a detail view in section on the plane indicated by the broken line 7—7 of Figure 1.

Figure 8 is a detail view of the reaction device on the plane indicated by the broken line 8—8 of Figure 1.

In the embodiment of the invention illustrated in Figures 1 to 8, the driving shaft $a$ of the transmission is rotated through a suitable connection to the motor or prime mover. Near its left-hand end it is formed or provided with a head $a^1$ which receives a transverse spindle $a^2$ to which is secured a cage or drum $a^3$. On the spindle $a^2$ are mounted for rotation beveled gears $b$, both of which mesh at one side with a beveled gear $b^1$ which is supported through its hub $b^2$ on the end portion $a^4$ of the driving shaft $a$. Fast on the hub $b^2$ of the gear $b^1$, so as to rotate therewith, is one part $c$ of a housing which carries or has secured thereto centrally, as at $c^1$, what may be regarded as the driven shaft. The other part $c^2$, of the housing, secured to the first part in any convenient manner, as by screw bolts $c^3$, is rotatably supported on the right hand portion of the driving shaft $a$ through the medium of an interposed sleeve $f^1$ to be referred to. The housing is provided at some convenient point with a filling plug $c^4$ to permit the introduction into the housing of the liquid through the medium of which power is transmitted as hereinafter described, such liquid substantially filling the housing.

The gears $b$ mesh on the opposite side from the gear $b^1$ with a gear $d$, rotatably mounted, through its hub $d^1$, upon the shaft $a$. Secured to the hub $d^1$ of the gear $d$ is an impeller $e$ which is formed or provided peripherally with radial blades $e^1$ which, in this embodiment of the invention, are obliquely disposed with reference to the plane of rotation of the impeller for a purpose to be explained. The blades are tapered outwardly as shown so that they may be fitted with a freely working fit into a similarly shaped opening formed in the adjacent walls of the annular, opposed members $f$ and $g$. The member $f$ may be termed for convenience the reaction member, being carried by the sleeve hub $f^1$, previously mentioned, which is rotatably mounted on the shaft $a$ and has secured thereto the circular part $f^2$ of the reaction device. The latter permits free rotation of the reaction member in one direction but prevents rotation thereof in the opposite direction. Any suitable construction may be provided for the purpose. As shown, a stationary part $f^3$ of the reaction device carries a ball $f^4$ for coaction with the part $f^2$, in the manner of a ball clutch.

The other member $g$, which may be called the driven member or the rotor, placed face to face with member $f$ and similarly formed, as will be described, is secured to the housing $c$, $c^2$, to rotate therewith, having, it may be, a flange $g^1$ interposed between the ends of the two housing parts $c$ and $c^2$, and held by the screw bolts $c^3$. Mounted on the member $g$ are bodies $h$, subject to centrifugal action for the purpose of effecting direct connection between the driving shaft $a$, through its drum $a^3$, and the housing $c$, $c^2$ and therefore the driven shaft $c^1$. These bodies are conveniently pivoted, near one end, as at $h^1$, on the member $g$, and are provided each with a foot $h^2$ which normally under the influence of the spring $h^3$, rests against the inside of the housing $c$ and with a foot $h^4$ which, when the speed of rotation of the member $g$ reaches a predetermined degree and the longer part of the body is thrown outward under the influence of centrifugal action, is pressed against the drum $a^3$ to compel the member $g$ and therefore the driven shaft $c^1$ to rotate at the same speed as the driving shaft.

The two members $f$ and $g$, standing face to face, are recessed to form between them an annular chamber, suitably curved in cross-section, and each member has its respective portion of such chamber provided with vanes or blades $f^x$ and $g^x$ respectively, the vanes or blades of each series forming between them pockets $f^{1x}$, $g^{1x}$, respectively. The blades $f^x$ and pockets $f^{1x}$ of one member are oppositely inclined, in the plane of rotation, with respect to the blades $g^x$ and pockets $g^{1x}$ of the other member. The walls of the two members $f$ and $g$ are cut away at the side of the annular chamber nearest the axis of rotation of the two members so as to admit the peripheral edge of the impeller $e$ with its blades $e^1$.

It will now be understood that when the housing, including the annular chamber formed by the two members $f$ and $g$, has been filled or substantially filled with a suitable liquid and the impeller is rotated from the prime mover the liquid in such annular chamber will be caused to assume a vortical movement, being driven into the obliquely disposed pockets of the member at one side of the impeller blades and from such pockets into the pockets of the other member at the opposite side of the annular chamber and returning to the impeller from such other pockets. The effect of the vortical movement of the liquid is to tend to move the reaction member $f$ in the direction in which its movement is prevented by the reaction device $f^2$, $f^3$ and the liquid therefore passes from the pockets of the reaction member through the pockets of the impeller to the pockets of the rotor and passes from the pockets of the rotor $g$ back to the pockets of the reaction member with practically the same velocity with which it left the reaction member, subject only to negligible friction losses. The impeller blades are moving at the same velocity and after operation is started the velocity of the vortical movement of the liquid is rapidly built up toward the predetermined maximum at which the 1:1 ratio of the driving member and the driven member is established. For a certain speed of the vortical movement of the liquid a proportionate torque is exerted on the rotor. As the velocity of the vortical movement is determined by the speed of the impeller, it is evident that greater torque is attained by increasing the speed of the impeller.

When the blades $e^1$ of the impeller are placed obliquely with respect to the plane of rotation of the impeller and are inclined forward, that is, in the same direction as the blades of the rotor, as in the construction described, the velocity of vortical movement of the liquid will be constantly increased without increasing the speed of the impeller and the torque on the rotor is correspondingly increased, by reason of the inertia of the mass, in proportion to the square of the velocity of the vortical movement of the liquid.

When the speed of the rotor attains a predetermined degree at which the speed ratio of the driving member and the driven member should be 1:1, direct coupling of the impeller to the housing and therefore of the driving shaft to the driven shaft is accomplished by the action of the centrifugal bodies $h$, as already described. Under this condition the reaction member ceases to function as a reaction member and overruns the reaction device at the speed of the rotor.

It will be observed that the liquid has no centrifugal action in the plane of rotation of the impeller and that its action is due to the vortical movement which is established in the opposite pockets of the opposed members $f$ and $g$ by the action of the impeller.

The blades of the impeller will be set at whatever angle will secure the greatest efficiency in a transmission designed for a particular purpose. Relatively slow impeller speed (giving low liquid speed) and large volume of liquid for a given horse power secure greater efficiency than high speed and small volume. For automobiles the size of the transmission and therefore the volume of the liquid are necessarily limited and the required horse power must therefore be developed through increase in speed of movement of the liquid. It is not essential that the speed of the rotor be brought up to the speed of the impeller for the reason that the predetermined speed, at which the rotor is compelled through mechanical connection to attain the same speed as the motor, is lower than the motor speed. In the application of the transmission to an automobile increased horse power is required in order to accelerate the movement of the automobile and to secure such increased horse power the speed of the impeller must be increased for the reason stated. To convert the increased speed of the impeller into torque there must be an equal reaction force. For example, the motor might run at 2000 R. P. M. while the speed of the automobile is 10 miles per hour. Assuming a driving axle ratio of 5:1 and a wheel circumference of 8 feet the conditions are expressed in the following equation:

$$\frac{10 \times 5280 \times 5}{8 \times 60} = 550 \text{ R. P. M. of the rotor.}$$

The transmission ratio is equal to the speed of the motor divided by the speed of the rotor, that is, in the case assumed, $$\frac{2000}{550} = 3.6 \text{ as the transmission ratio.}$$

Assuming further that 550 R. P. M. is the predetermined rotor speed at which the centrifugal clutch acts in order to establish the 1:1 ratio, then at that moment (clutch slippage being neglected) the motor speed also becomes 550 R. P. M. If the resistance of the movement of the automobile does not increase, as on a level road, higher motor speed then gives higher automobile speed in direct drive and at say 60 miles per hour the motor speed (six times the speed of 10 miles per hour assumed above) will be 6×550 or 3300 R. P. M.

In the construction shown the torque of the driving shaft $a$ is divided through the bevel gears $b$, $b^1$, between the driven shaft $c^1$ and the impeller, but so long as the resistance of the driven shaft prevents its rotation the horse power delivered to the driving shaft $a$ goes into the impeller which then runs at twice the speed of the shaft $a$ and, through the rotor $g$, builds up the torque on the driven shaft $c^1$. The torque of the driving shaft $a$ is divided by the driven shaft $c^1$ and the impeller so long as the rotor has not attained the predetermined speed which effects the engagement of the clutch for a 1:1 ratio. The impeller as well as the rotor and the reaction member can therefore be housed in a relatively small casing adapted to the requirements of automobile use.

I claim as my invention:

1. In a hydraulic transmission, the combination of a reaction member rotatable freely in one direction and a rotor placed face to face with the reaction member, the reaction member and the rotor forming a chamber between them and being formed with obliquely opposed pockets, an impeller, a driven part in operative relation with the rotor, a driving element, centrifugal bodies carried by the rotor and adapted under the influence of centrifugal action to effect connection between the rotor and the driving element, and torque dividing transmission gearing interposed between the impeller and the rotor, said torque dividing transmission gearing including said driving element.

2. In a hydraulic transmission, the combination of a reaction member rotatable freely in one direction and a rotor placed face to face with the reaction member, the reaction member and the rotor forming a chamber between them and being formed with obliquely opposed pockets, an impeller, a driven part in operative relation with the rotor, a driving element, centrifugal bodies carried by the rotor and adapted under the influence of centrifugal action to effect connection between the rotor and the driving element, and torque dividing transmission gearing interposed between the impeller and the rotor, said torque dividing transmission gearing including said driving element; said torque dividing transmission gearing comprising a bevel gear rotating with the impeller, a bevel gear rotating with the rotor, and a planetary bevel gear in mesh with both of the first named gears and carried with the driving element.

This specification signed this 4th day of April A. D. 1928.

CARL W. WEISS.